United States Patent [19]
Benner et al.

[11] Patent Number: 6,149,255
[45] Date of Patent: Nov. 21, 2000

[54] CORNER CONNECTOR FOR A RACK

[75] Inventors: Rolf Benner; Martina Köhler, both of Herborn; Udo Münch, Sinn; Wolfgang Reuter, Burbach, all of Germany

[73] Assignee: Rittal-Werk Rudolf Loh GmbH & Co. KG, Herborn, Germany

[21] Appl. No.: 09/308,417

[22] PCT Filed: Nov. 6, 1997

[86] PCT No.: PCT/EP97/06153

§ 371 Date: May 18, 1999

§ 102(e) Date: May 18, 1999

[87] PCT Pub. No.: WO98/23013

PCT Pub. Date: May 28, 1998

[30] Foreign Application Priority Data

Nov. 19, 1996 [DE] Germany .......................... 196 47 791

[51] Int. Cl.[7] ................................................. A47G 29/00
[52] U.S. Cl. .................................. 312/265.4; 312/265.1; 312/257.1
[58] Field of Search ................................ 312/257.1, 263, 312/265.1, 265.2, 265.3, 265.4, 265.5, 265.6

[56] References Cited

U.S. PATENT DOCUMENTS

| | | | |
|---|---|---|---|
| 2,058,263 | 10/1936 | Rosendale | .......................... 312/265.4 |
| 3,182,846 | 5/1965 | La Kaff | .......................... 312/257.1 X |
| 3,919,603 | 11/1975 | Salvati et al. | . |
| 4,691,970 | 9/1987 | Neri | .......................... 312/265.5 |
| 5,498,073 | 3/1996 | Charbonneau et al. | . |
| 5,639,150 | 6/1997 | Anderson et al. | .......................... 312/265.4 X |

FOREIGN PATENT DOCUMENTS

| | | | |
|---|---|---|---|
| 538045 | 4/1993 | European Pat. Off. | ........... 312/265.4 |
| 0 649 205 | 4/1995 | European Pat. Off. | . |
| 2 674 581 | 10/1992 | France | . |
| 2251410 | 4/1973 | Germany | .......................... 312/265.4 |
| 25 04 721 | 8/1976 | Germany | . |
| 4135108 | 5/1993 | Germany | . |
| 44 39 624 | 5/1996 | Germany | . |
| 695180 | 4/1953 | United Kingdom | ............... 312/265.4 |
| 2095101 | 9/1982 | United Kingdom | ............... 312/265.4 |

*Primary Examiner*—Peter M. Cuomo
*Assistant Examiner*—Hanh V. Tran
*Attorney, Agent, or Firm*—Pauley Petersen Kinne & Fejer

[57] ABSTRACT

A corner connector for a switching cabinet with depth and length struts which are disposed horizontally and joined to vertical frame pieces in corner areas by corner connectors. Substantial flexibility of use is achieved with the corner connector having a compensating element enabling differently structured vertical frame pieces to be connected according to choice.

2 Claims, 2 Drawing Sheets

CORNER CONNECTOR FOR A RACK

BACKGROUND OF THE INVENTION

1. Field of the Invention

This invention relates to a rack for a switching cabinet with horizontal depth and length struts to which vertical frame legs are attached in corner areas with corner connections and wherein the corner connection has a compensating piece.

2. Description of Prior Art

Such a rack is known from French Patent Reference FR 2 674 581.

The rack shown in this document has a lower and upper frame. In the corner areas of the lower and upper frame vertical frame profiles can be attached. For this attachment, corner connectors are used. The corner connectors have three plug inserts, each vertical to the others. The horizontal depth and length struts as well as the vertical frame legs are pushed onto these plug inserts. For the fixation of a vertical frame leg two clamp elements are used. The clamp elements have interlocking projections and can be screwed onto the plug insert whereby the interlocking projections stand out over the outer geometry of the plug insert. The vertical frame profile has two recesses which are formed and adapted in their geometry to the interlocking projections. On pushing the vertical frame profile onto the plug insert the clamp elements are initially swiveled out and then snap behind the recesses so that the vertical frame profile is compressed onto an impact face of the corner connector with its front side.

Varying demands are made on switching cabinets. The vertical frame legs in particular must be formed adapted thereto. Thus, for example, various cross-sections are used for frame legs which are suitable for various possible designs.

Adapted switching cabinets have been conceived for these varying possible applications whereby a high expenditure is required.

For example, in German Patent Reference DE 41 35 108 a corner connector is known in which three projections perpendicular to one another are mounted on a base body. The individual frame legs and length and depth struts can be pushed onto the projections.

Another corner connector is described in German Patent Reference DE 44 39 624. A base body is also used on which two projections stand out for each frame leg and each length and depth strut. The projections are plugged into hollow chambers, for example of the frame leg.

SUMMARY OF THE INVENTION

It is one objective of this invention to provide a switching cabinet of the type mentioned initially which offers in a simple manner flexibility for varying possible applications.

This objective is accomplished with optional differently structured vertical frame legs which can be attached and the open spacing between neighboring vertical frame legs determined by compensating pieces.

With this development it is possible for inserts each with a varying insert width to be affixed between the vertical frame legs. This makes it possible to prepare racks that can be adapted to various systems of measurement without great expenditure. For example, a rack which is designed in the metric system can be modified simply so that 19" units can be introduced between the vertical frame legs. With this simple measure a great flexibility in switching cabinets can be made possible.

According to a development of this invention, the depth and length struts are formed as hollow profiles which have openings for vertical inserts in the corner areas of the rack and the compensating pieces can be introduced into the openings.

In the case of such developments of a rack, inserts as well as compensating pieces can be introduced into the openings. The compensating pieces can vary independently of the cross-sectional geometries of the vertical frame leg. The insert itself can also be structured variably.

According to a simple development of this invention the length and depth struts have the same cross-sectional form and are bent from one section of sheet metal so that the length and depth struts have a horizontal cover section to which an angled section running parallel to the outer side of the rack adjoins, to which a perpendicular fold directed inwards adjoins. A wall extending parallel to the angled section adjoins the perpendicular fold which together with the perpendicular fold forms an opening recessed with respect to the angled section, and the wall extends into a base part. By the length and depth struts having the same cross-sectional form and being bent from one section of sheet metal a simple base frame can be constructed.

If the cover section is set back in the longitudinal direction of the depth and length struts with respect to the base part, an opening for the insert is formed. The insert can abut the walls of the length or depth struts with stop faces. Thus the insert can be aligned simply and can quickly and securely be connected to the length and depth struts, for example by welding.

In a simple development of a frame leg in which the open distance between the two vertical front frame legs is variable the vertical insert is introduced into the opening formed in the corner area, the insert abuts the wall of the depth strut with a fastening section, and the insert abuts a stop face of a compensating piece which is introduced between the insert and the cover section of the length strut.

BRIEF DESCRIPTION OF THE DRAWINGS

This invention will be explained in the following according to an example represented in the drawings wherein.

DESCRIPTION OF PREFERRED EMBODIMENTS

Figure 1:
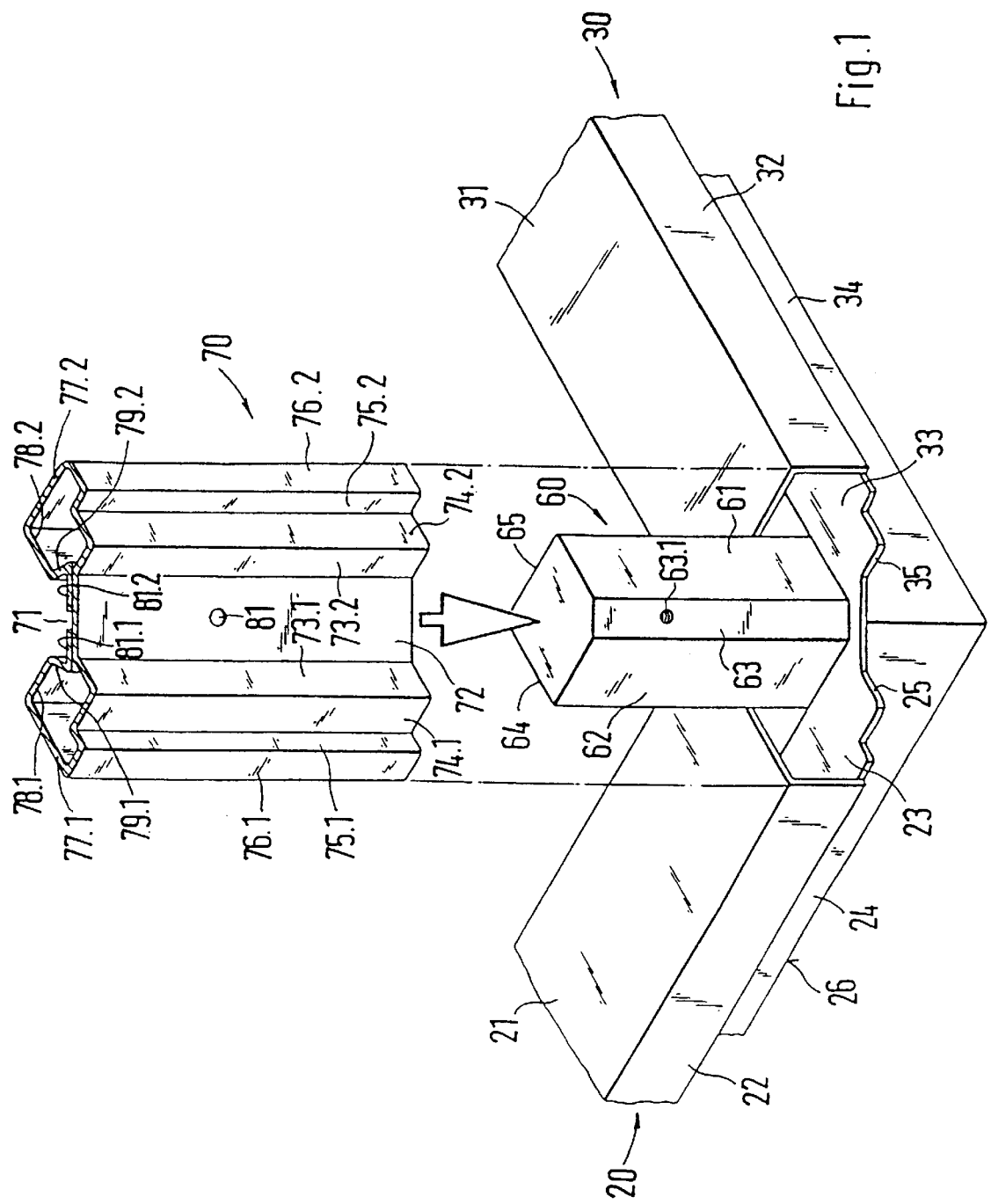
FIG. 1 is a perspective lateral view of a socket of a rack to which a vertical frame leg can be affixed.

FIG. 1 shows a socket comprising depth and length struts 20 and 30 with the same cross-sectional geometry. The depth or length struts 20 or 30 are bent from one section of sheet metal. Thereby a horizontal cover section 21, 31 is provided from which an angled section 22, 32 is folded perpendicularly downwards. The angled sections 22, 32 are parallel to the outer sides of the rack. Lateral wall elements of the switching cabinet can abut the angled sections 22, 32.

A seal can be provided between the lateral wall elements and the angled sections 22, 32 for sealing. A perpendicular fold 23, 33 is bent back from the angled sections 22, 32 and extends into a vertical wall 24, 34 which in the socket rests on the base. In the recess formed by the wall 24, 34 and the fold 23, 33 a fold of the lateral wall elements can be accommodated. On an underside of the length or depth struts 30 or 20, which are not visible, a base part 26 is disposed.

For the formation of a corner connection, the cover section 21, 31 is set back at the face of the length and depth struts 30, 20 with respect to the base part 26. Thus an opening is formed which provides access to the inside of the length or depth struts 30 or 20. An insert 60 can be set into the opening. The insert 60 is perpendicular to the length or depth strut 30 or 20 and has two centering faces 61, 62 perpendicular to one another which abut the walls 24, 34. On the underside the insert 60 rests on the base part 26. At two free faces 64, 65 the insert 60 abuts the cover sections 21, 31 on the face. By the insert 60 abutting the walls 34, 24 with the two free faces 61, 62 a vertical alignment can be achieved simply. The insert 60 can then be fastened simply to the socket, for example fixedly screwed or welded onto the socket.

Now a vertical frame leg 70 can be secured on the insert 60. The vertical frame leg 70 has for this purpose a connecting flange 72 to which hollow chambers are adjacent on the right and left. The hollow chambers are formed in this case from a multiple angled section of sheet metal. In detail an angled section 73. 1, 73.2 adjoins the connecting flange 72. The angled section 73.1, 73.2 extends into the fold 75.1, 75.2 via a transitional section 74.1, 74.2. The folds 75.1, 75.2 are in this case perpendicular to the lateral walls of the rack. From the folds 75.1, 75.2 abutting flanges 76.1, 76.2 are angled off perpendicularly and thus aligned parallel to the lateral walls of the rack. The lateral wall elements can abut the abutting flanges 76.1, 76.2 forming a seal. The abutting flanges 76.1, 76.2 turn into lateral walls 77.1, 77.2.

The lateral walls 77.1, 77.2 are at a right angle to one another and with the guide faces 78.1, 78.2 form vertical folds which are directed toward the inside of the rack.

Rows of fastening openings can be provided on the lateral walls 77.1, 77.2 and the guide faces 78.1, 78.2 in which inserts can be fixed. The guide faces 78.1, 78.2 extend into groove lateral walls 79.1, 79.2 which are at an angle to one another and thus form back-cut dovetail grooves.

The groove lateral walls 79.1, 79.2 are bent up in their groove base to form end pieces 81.1, 81.2. The end pieces 81.1, 81.2 are aligned parallel to and abut the connecting flange 72.

For the fastening of the vertical frame leg 70 to the insert 60 the guide faces 78.1,78.2 abut the centering faces 61, 62 of the insert 60. The frame leg 70 can be screwed fixedly onto the insert 60. Thus a screw opening 81 is introduced in the connecting flange 72. The insert 60 has a threaded opening 63.1 flush at a fastening section 63. Additionally or alternatively the vertical frame leg 70 can also be welded to the depth and length struts 20 and 30. The depth and length struts 20, 30 have notches 25, 35 on their perpendicular folds 23, 33. The notches 25, 35 are structured so that they are adapted to the outer contour of the frame leg 70. Thus a simple welding can also be done here. No pointed projections are formed which would represent a danger of injury.

Figure 2:
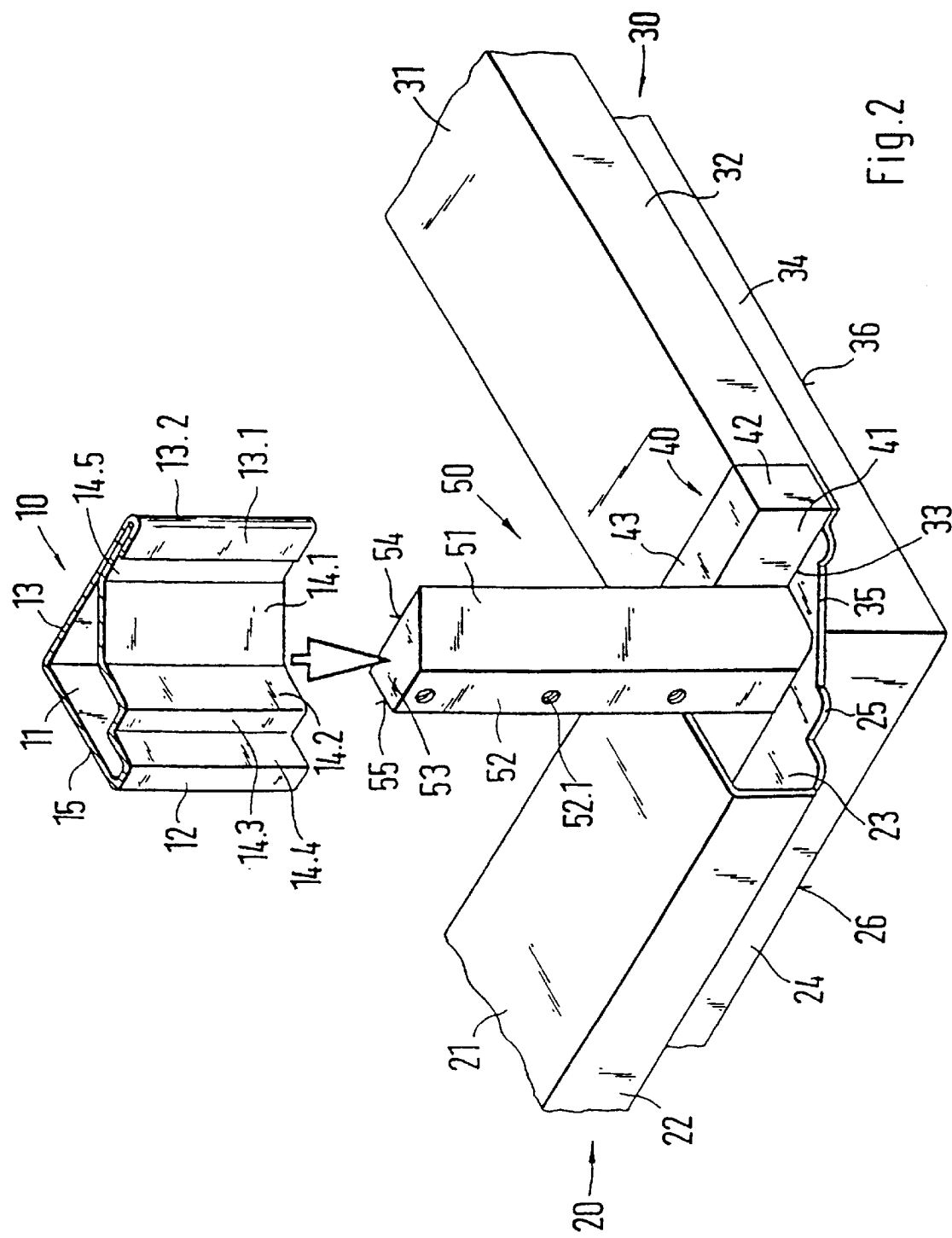
FIG. 2 is a perspective lateral view of the socket according to FIG. 1 on which another vertical frame leg can be mounted.

FIG. 2 shows how the socket composed of length and depth struts 20 and 30 can be modified by means of a compensating piece 40 in such a way that another vertical frame leg 10 with a cross-sectional geometry different from frame leg 70 can be incorporated. For this another insert 50 is used. The insert 50 has a fastening section 52 which abuts the wall 24 of the depth strut 20.

In the fastening section 52 threaded openings 52.1 are introduced on which the vertical frame leg 10 can be screwed. Furthermore the insert 50 has three centering faces 51, 54, and 55. The centering face 55 abuts the cover section 21 of the depth strut 20. The second centering face 54 is disposed parallel to the fastening section 52 and abuts a stop face 41 of the compensating piece 40. The compensating piece 40 is formed rectangularly in cross-section and rests on a right-angled fold 33 of the length strut 30. On the forward side the compensating element 40 closes with a front side 42 the angled section 32. The compensating element 40 is pushed against the cover section 31 and can be secured here, for example by welding.

Now the vertical frame leg 10 can be pushed onto the insert 50. The vertical frame leg 10 has two lateral walls 13 and 15 at a right angle to one another. The two lateral walls 13 and 15 form one vertical fold which is directed toward the inside of the rack. The lateral wall 15 extends into an angled section 12 which is directed parallel to the lateral face of the rack. Lateral wall elements can be placed on the angled section 12 to form a seal. The angled section 12 extends into two folds 14.1, 14.2 via a transitional section 14.3. The folds 14.1, 14.2 are at an angle to one another and form a free space in which, for example, hinge elements or lock elements of a door lock apparatus can be incorporated.

The fold 14.1 strikes the lateral wall 13 on the back side and extends into an end section 14.5 which is directed parallel to the lateral wall 13. The lateral wall 13 reaches over the end section 14.5 by means of a fold 13.1. The lateral wall 13 and the fold 13.1 form a sealed edge 13.2 running vertically.

In the mounted state the insert 50 is introduced into the opening 11 enclosed by the vertical frame leg 10. The vertical frame leg 10 can then be welded to the depth strut 20 and to the compensating piece 40. In addition, the vertical frame leg 10 can be screwed to the threaded openings 52.1 of the fastening section 52.

In the case of the rack thus modified the slight gap between the two front vertical frame legs 10 is enlarged. Now with this enlargement wider inserts can be introduced between the vertical frame legs 10. A preferred application is in a rack which can be used in the case of inserts with housing dimensions of 19" between the vertical frame legs 10. If a metric construction version is to be achieved, then the compensating piece 40 is omitted and the embodiment according to FIG. 1 used.

What is claimed is:

1. In a rack for a switching cabinet with horizontal depth struts and length struts to which vertical frame legs are attached in corner areas via corner connections where each of the corner connections has a compensating piece, the improvement comprising: the compensating piece (40) accommodating differently structured ones of the attached vertical frame legs (10, 70) and the compensating pieces (40) each secured within an open spacing between adjacent ones of the vertical frame legs (10, 70);

the depth struts and the length struts (20, 30) formed as hollow profiles having openings accommodating one of a plurality of vertically standing inserts (50, 60) in the corner areas of the rack, the compensating pieces (40) introduced into the open spacings;

the spacing between the vertical frame legs (10) set to one of metric and English component dimensions;

the length struts and the depth struts (20, 30) having a same cross-sectional form and bent from one section of sheet metal, the length struts and the depth struts (20, 30) having a horizontal cover section (21, 31) to which an angled section (22, 32) running parallel to an outer side of the rack adjoins and to which a perpendicular fold (23, 33) adjoins, a wall (24, 34) extending parallel to the angled section (22, 32) adjoining the perpendicular fold (23, 33) and with the perpendicular fold (23, 33) forming an opening recessed with respect to the angled section (22, 32) and the wall (24) extending into a base part (26, 36);

the cover section (21, 31) set back in a longitudinal direction of the depth struts and the length struts (20, 30) with respect to the base part (26, 36) forming an opening for one of the inserts (50, 60); and one of the vertically standing inserts (50) introduced into the opening formed in the corner area, abutting the wall (24) of the depth strut (20) with a fastening section (52), and abutting a stop face (41) of one of the compensating pieces (40) which is introduced between the one of the vertically standing inserts (50) and the cover section (31) of the length strut (30).

2. In the rack according to claim 1 wherein the walls (24, 34) of one of the length struts and the depth struts (20, 30) form a plurality of stop faces for one of the inserts (50, 60).

* * * * *